No. 839,562. PATENTED DEC. 25, 1906.
S. A. DEAN.
TIME RECORDER.
APPLICATION FILED FEB. 26, 1906.

5 SHEETS—SHEET 1.

INVENTOR
SEWARD A. DEAN
BY
Paul & Paul
HIS ATTORNEYS

WITNESSES

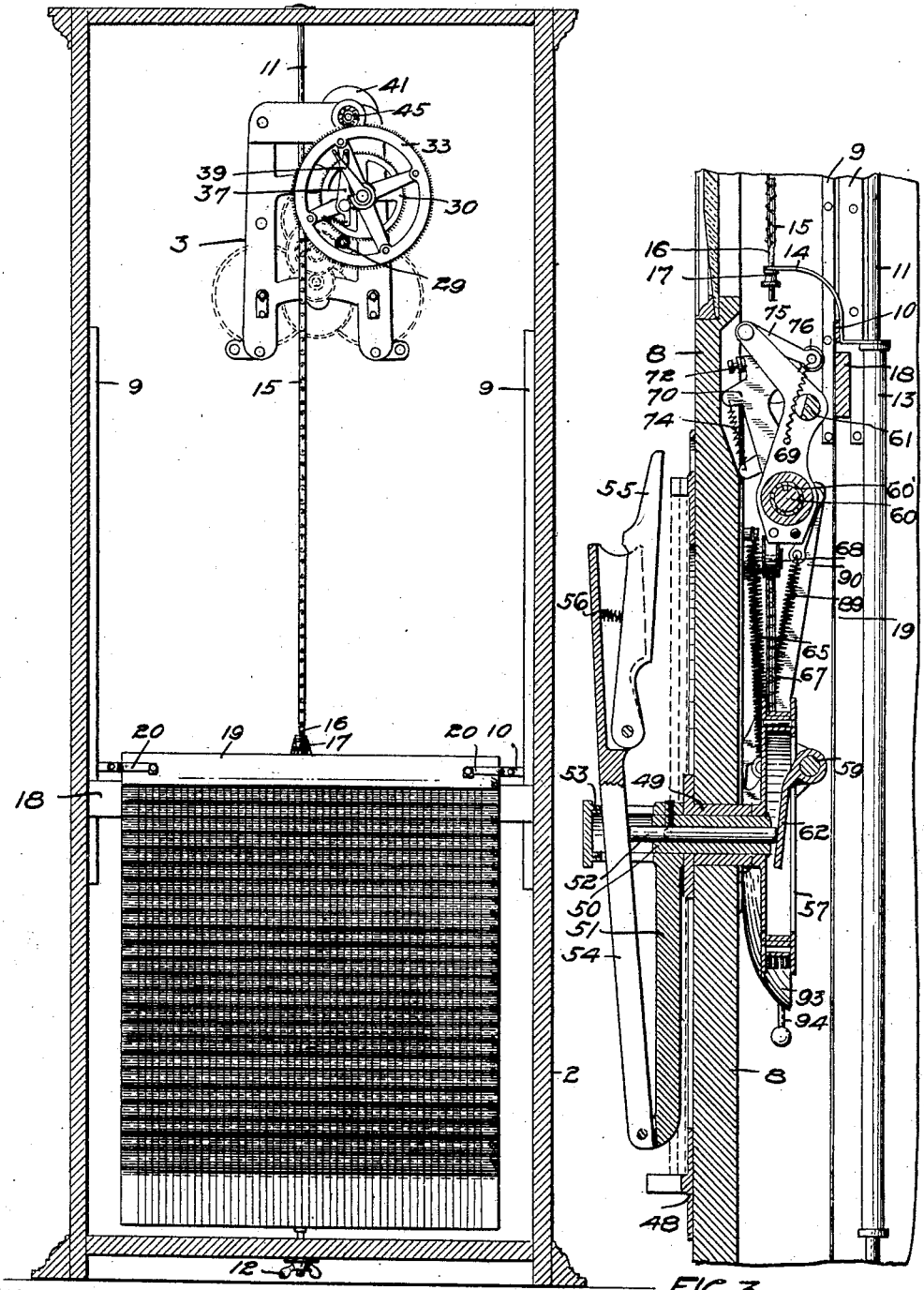

No. 839,562. PATENTED DEC. 25, 1906.
S. A. DEAN.
TIME RECORDER.
APPLICATION FILED FEB. 26, 1906.
5 SHEETS—SHEET 3.
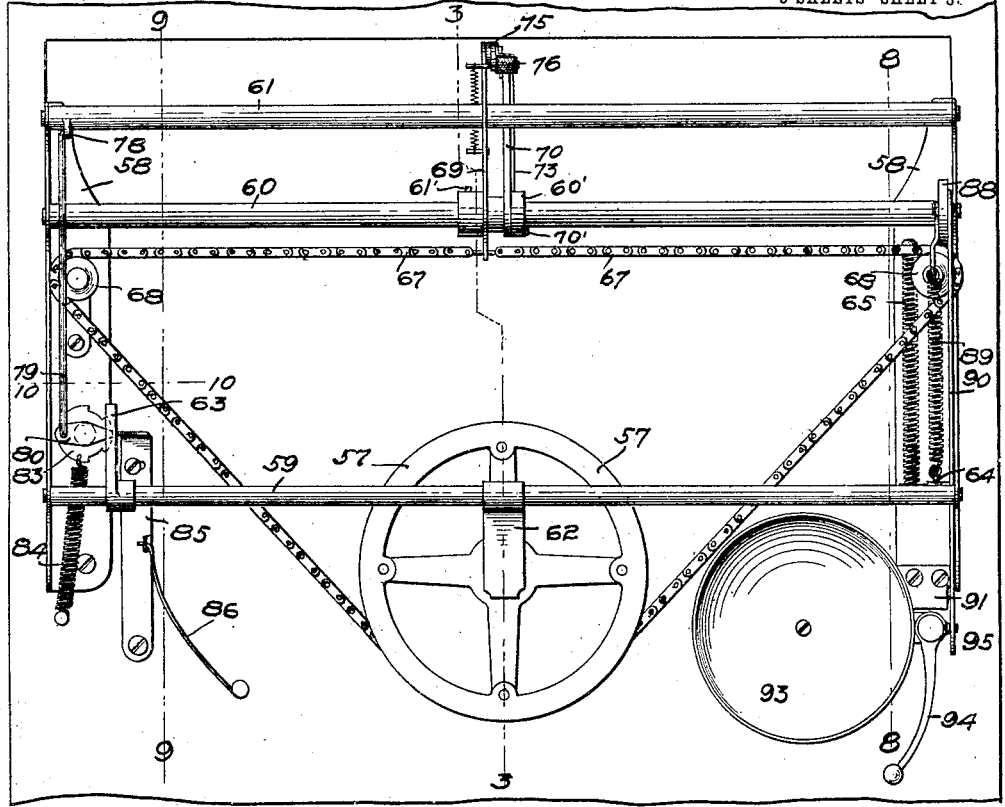
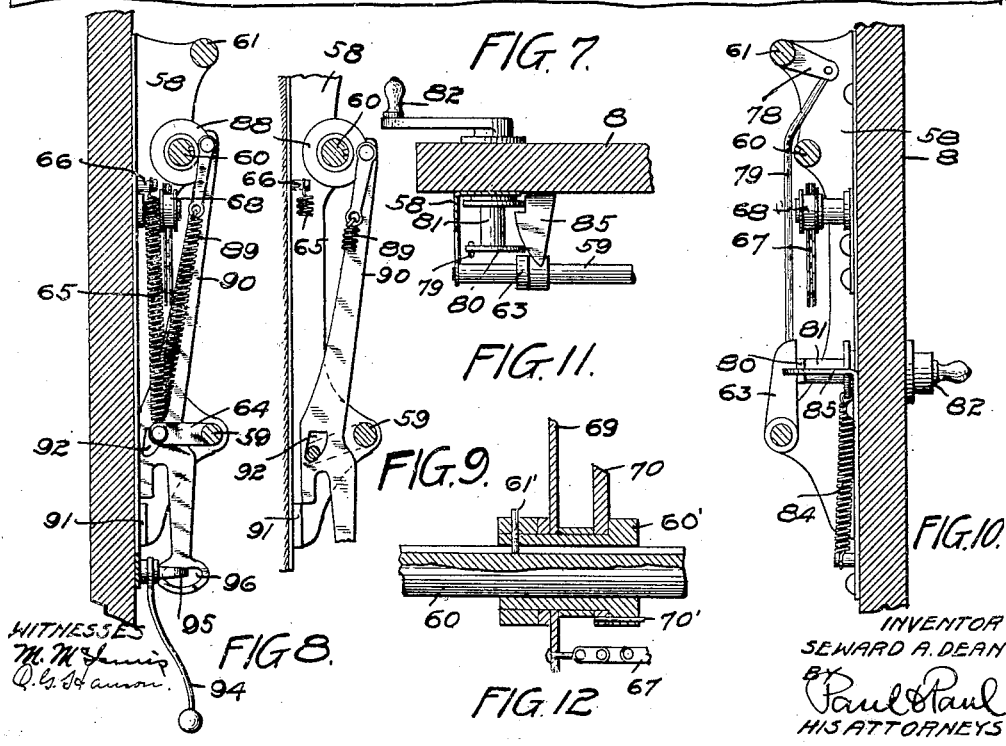
WITNESSES
INVENTOR
SEWARD A. DEAN
BY Paul & Paul
HIS ATTORNEYS No. 839,562.  
PATENTED DEC. 25, 1906.

S. A. DEAN.  
TIME RECORDER.  
APPLICATION FILED FEB. 26, 1906.

5 SHEETS—SHEET 4.

WITNESSES  
INVENTOR  
SEWARD A. DEAN  
BY  
HIS ATTORNEYS

No. 839,562.　　　　　　　　　　　　　　　　　PATENTED DEC. 25, 1906.
S. A. DEAN.
TIME RECORDER.
APPLICATION FILED FEB. 26, 1906.

WITNESSES

INVENTOR
SEWARD A. DEAN
BY
Paul & Paul
HIS ATTORNEYS

UNITED STATES PATENT OFFICE.

SEWARD A. DEAN, OF HASTINGS, MINNESOTA, ASSIGNOR OF ONE-HALF TO EUGENE A. COOPER, OF BRITTON, SOUTH DAKOTA.

TIME-RECORDER.

No. 839,562.	Specification of Letters Patent.	Patented Dec. 25, 1906.

Application filed February 26, 1906. Serial No. 303,055.

*To all whom it may concern:*

Be it known that I, SEWARD A. DEAN, of Hastings, Dakota county, Minnesota, have invented certain new and useful Improvements in Time-Recorders, of which the following is a specification.

This invention relates to improvements in time-recorders designed to make a permanent record of the time when each employee of a business establishment enters or leaves the place of business.

The objects I have in view are to provide a device of this kind that shall be simple and inexpensive in construction and by means of which each employee entering or leaving the place of business may quickly make a permanent record showing the time when he comes in or goes out.

The invention consists generally in the constructions and combinations hereinafter described, and particularly pointed out in the claims.

Figure 1:
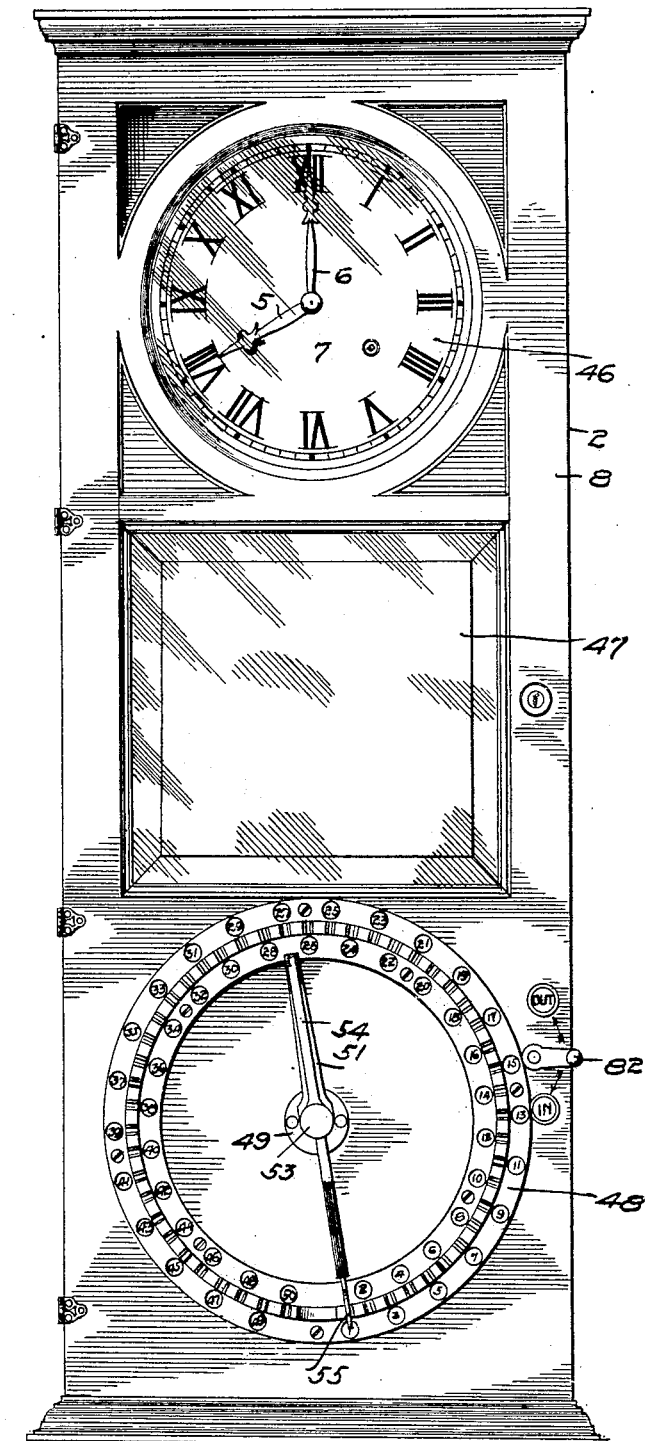
Figure 4:
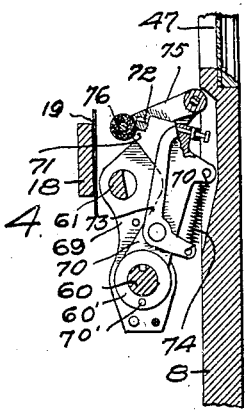
Figure 5:
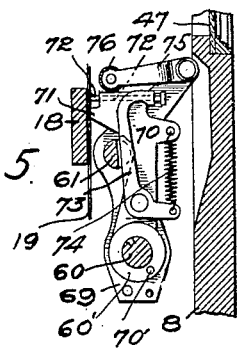
Figure 6:
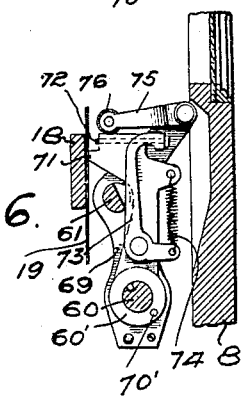
Figure 13:
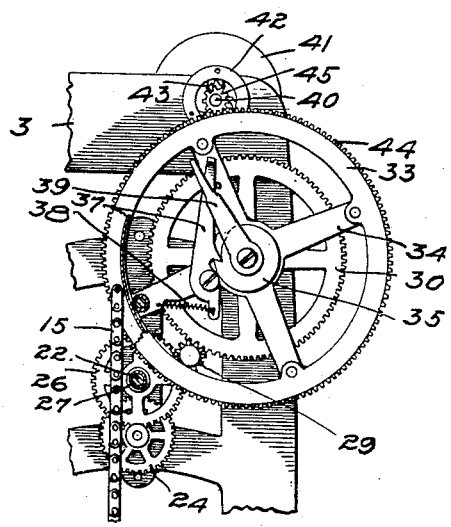
Figure 14:
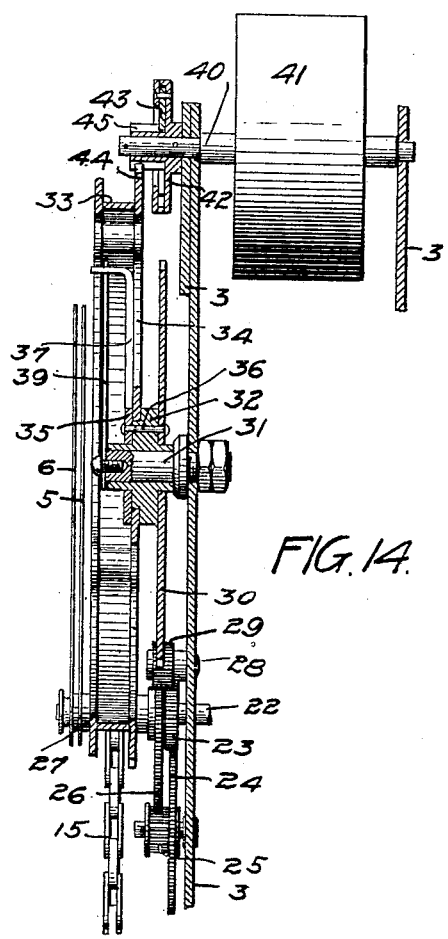
Figure 15:
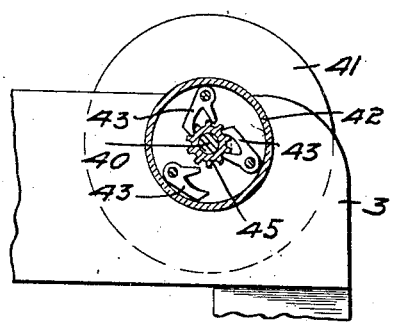
Figure 16:
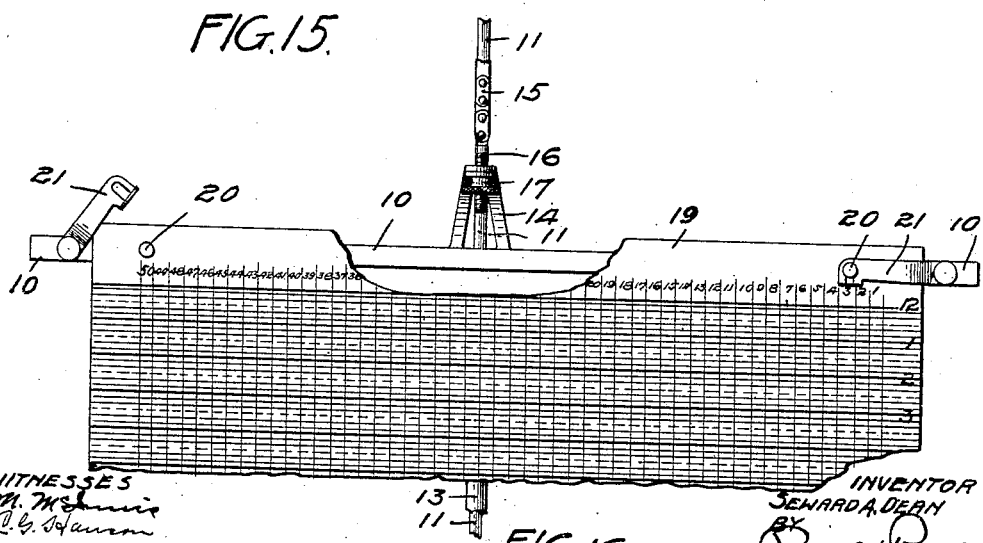

In the accompanying drawings, forming part of this specification, Figure 1 is a front elevation of a time-recorder comprising my invention. Fig. 2 is a similar view showing the front of the machine removed. Fig. 3 is a detail section on line 3 3 of Fig. 7, showing the operating-lever and the printing mechanism. Figs. 4, 5, and 6 are details of the printing mechanism. Fig. 7 is a partial elevation showing the means for moving the printing or recording mechanism to the proper position in relation to the sheet. Fig. 8 is a detail section on the line 8 8 of Fig. 7. Fig. 9 is a view similar to Fig. 8, showing the parts in the position to which they are moved by the operating-lever as the record is made. Fig. 10 is a detail section on the line 9 9 of Fig. 7. Fig. 11 is a detail section on the line 10 10 of Fig. 7. Fig. 12 is a detail section showing the manner of connecting the recording mechanism to its supporting-shaft. Fig. 13 is a side elevation, partly broken away, showing the means for moving the record-sheet. Fig. 14 is a vertical section of the parts shown in Fig. 13, but on a larger scale. Fig. 15 is a detail section showing the means for regulating the descent of the record-sheet. Fig. 16 is a partial elevation of the record-sheet and its supporting means. Fig. 17 is a partial elevation looking toward the inner side of the door, showing a modified construction of the "in" and "out" mechanism. Fig. 18 is a partial section of the door and of the same mechanism that is shown in Fig. 17. Fig. 19 is a detail showing the mechanism turned into position for unlocking the printing device. Figs. 20 and 21 are details illustrating the operation of this mechanism.

In all of the drawings, 2 represents the casing of the machine, which may be of any preferred or usual construction. Arranged within the casing is a clock mechanism 3, which may be of any usual or preferred construction, and this mechanism is provided with the usual clock-hands 5 and 6, arranged in front of a dial 7 of any ordinary construction. The casing has at its front a door or wall 8, preferably hinged, and therefore capable of being opened by being swung on its hinges. The casing is provided upon its inner walls with the vertical guides or ways 9 9, and a bar 10, which forms a support for the record-sheet, extends across the casing and has its ends engaging and guided by said ways. This bar is capable of moving up and down in the casing. Extending through the casing, preferably from top to bottom, is a guide-rod 11. The lower end of this rod is preferably screw-threaded and is provided with a suitable thumb-nut 12. A tube 13 is arranged upon the rod 11 and is capable of sliding freely thereon. An arm 14 is secured to the upper end of this tube and to the bar 10. The upper end of this arm preferably extends forward and has connected to it the lower end of a suitable chain or cord 15. The lower end of the chain is preferably provided with a screw-threaded stem 16, which passes through the arm 14 and is held in position by a nut 17. By adjusting this nut the connection between the tube 13, the bar 10, and the chain 15 may be regulated. There is also arranged within the casing, near the lower ends of the ways 9, a flat cross bar or plate 18. This plate is in such position that when the record-sheet is in its lowest position the plate is back of the upper part of said sheet. (See Fig. 3.) This plate forms a platen against which the sheet is pressed in the printing operation. 19 represents the record-sheet that I prefer to employ. This is a rectangular sheet of paper having both horizontal and vertical rulings. The vertical rulings are numbered and provide separate columns for the individual workmen or employees, while the horizontal rulings indicate the hours and fractions thereof. For instance, the heavy horizontal lines preferably indicate the even hours, the dotted lines the half-hours, and the intermediate light full lines the ten-minute, twenty-minute, forty-minute, and fifty-minute periods. The bar 10 is provided with studs or buttons 20 and latches 21. Holes in the upper part of the sheet are made to engage the buttons 20, and the latches 21 are then turned into position to engage said buttons, thereby locking the upper edge of the sheet to the bar 10. The clock-arbor 22, which carries the clock minute-hand, (see Fig. 14,) carries also the usual pinion 23, which meshes with a gear-wheel 24, and this in turn, through the pinions 25 and gear 26, rotates the sleeve 27, carrying the hour-hand 5. These parts may all be of the usual construction. In proximity to the edge of the gear-wheel 26 is a stud 28, fixed in the clock-casing and carrying a pinion 29, which meshes with the gear 26. This pinion meshes in turn with a gear 30, mounted upon a stud 31, secured to the clock-casing. The gear 30 is preferably secured to a hub 32, which is adapted to rotate freely upon said stud 31. Upon the hub 32 and rotating freely thereon is a pulley or drum 33, which is mounted upon said hub by a spider having a series of arms 34 connected to a central ring that fits upon said hub. This spider is held in position upon the hub by means of a notched or clutch disk 35, which is secured by any suitable means to said hub. I have here shown rivets 36, securing both the disk 35 and the gear 30 to said hub. (See Fig. 14.) The disk 35 is provided on its edge with a ratchet tooth or notch, and a clutch-dog 37, pivoted to one of the spider-arms, is provided with a corresponding notch adapted to be engaged by the notch on the disk 35. A spring 38 engages the dog 37 and one of the spider-arms and tends to hold the notch or tooth on said dog in engagement with the notch or tooth on the disk 35. Secured to the end of the stud 31 is a stationary arm 39. The dog 37 has the end of its arm turned outwardly, so that as said dog is moved with the pulley this end will encounter the stationary arm 39. The parts being in the position shown in Figs. 2 and 3, the record-sheet will be at its lowest position, as shown in Fig. 2. The parts will preferably be arranged so as to be in this position at midnight, and as the clock-arbor rotates the pulley to which the chain 15 is connected will be slowly rotated, thereby raising the record-sheet each hour a distance equal to the space between two of the heavy full lines. This continues until the pulley has made nearly a complete revolution, when the outwardly-turned end of the clutch-dog 37 comes in contact with the stationary arm 39 and the tooth on said dog is forced out of engagement with the tooth on the disk 35. This leaves the pulley free to rotate in the reverse direction, and the weight of the bar 10, the tube 13, and the chain 15 causes said bar and the attached recording-sheet to descend, the ends of the bar being guided by the ways 9 and the chain unwinding from the pulley 33. This movement continues until the parts are brought into the position shown in Fig. 13, with the end of the dog 37 on the other side of the arm 39. The tooth on the dog will again be brought into engagement with the tooth on the disk 35, and the continued rotation of the clock-arbor will cause the bar and the attached record-sheet to be again elevated, and these parts will continue to move upwardly until the hour of midnight is again reached, when the tripping mechanism will again be brought into operation, the clutch will be disconnected, and the bar and the record-sheet attached thereto will again descend to their lowest position in the casing. It is the intention in using this device to apply a new record-sheet each day. This may be applied in the morning before the working hours begin, or it may be applied in the evening at the close of the working hours, or it may be applied at any time between the close of the working hours at night and the beginning of the working hours in the morning. The device, however, is ready for operation at any time, and a record may be made thereon by any of the employees who enter or leave the place of business before or after the usual working hours.

It is preferable to provide some means for regulating the descent of the paper-supporting bar and the record-sheet, so as to prevent the same from dropping too suddenly, and thereby jarring the clock mechanism. For this purpose I mount, preferably, in the upper part of the clock-frame a shaft 40, carrying a heavy roll or weight 41. This shaft carries a disk 42, having pivoted thereto suitable dogs 43. These dogs are preferably three in number. (See Fig. 15.) One edge of the pulley-rim is preferably provided with a series of teeth 44, and these teeth engage a pinion 45, loosely mounted on the shaft 40. This pinion rotates constantly with the pulley 33. The dogs 43 engage this pinion when the pinion is rotating in one direction, thereby causing the shaft 40 and the roll 41 to rotate therewith, and said dogs slip over the teeth of the pinion when the pulley and the pinion rotate in the opposite direction. With this arrangement the shaft 40 and the weight 41 do not rotate while the chain is being wound up by the pulley; but when the pulley is released and the bar 10 and the attached record-sheet move downward in the casing the dogs 43 are engaged by the teeth of the pinion 45; and the shaft 40 and weight 41 are compelled to rotate with the pulley 33. This retards the rotation of the pulley, and consequently retards the descent of the bar 10 and the attached record-sheet. It will be noted that the tube 13, which slides on the guide-rod 11, assists in guiding the bar and the attached record-sheet in their downward movement. It will also be noted that the record-sheet hangs directly in front of the plate 18, which forms a platen to support said plate in the printing operation. The mechanism shown within the casing in Fig. 2 of the drawings is all that is supported upon the walls of said casing. The printing mechanism and the mechanism for operating the same are preferably located upon and supported by the door. This door is preferably provided with a glass panel 46 in front of the clock-dial and also with a glass panel 47 below the clock-dial, through which the position of the record-sheet in the casing may be observed. Below the panel 47 is a flanged ring 48, arranged upon the outer surface of the door and provided with a series of notches or recesses equal in number to the number of employees or workmen that can be registered by the machine. These notches are numbered consecutively. (See Fig. 1.) A bearing-sleeve 49 is arranged in the door at the center of the ring 48, and mounted in this sleeve is a gudgeon 50, to the upper end of which is secured a crank-arm 51. A pin 52 is arranged centrally in the gudgeon 50 and is adapted to slide therein. The crank-arm 51 is provided with a slotted tubular post 53, and an operating-lever 54 is pivoted to the end of the crank-arm 51 and extends through this post. This lever is provided with a pivoted latch 55. Arranged in a recess in the end of the lever is a spring 56 engaging the latch, whereby the end of the latch is held normally in close proximity to the ring 48. Secured to the inner end of the gudgeon 50 is a pulley 57. This pulley preferably is located close to the inner surface of the door. (See Fig. 3.) Secured to the inner surface of the door, preferably near the edges thereof, are the flanged plates 58, which form bearings for rock-shafts 59, 60, and 61, which extend across the inner surface of the door. The shaft 59 is provided with a crank-arm 62, against which the pin 52, that is mounted in the gudgeon 50, bears. The rock-shaft 59 is also provided with a crank-arm 63. (See Figs. 7 and 10.) It is also provided with a crank-arm 64, to which is connected a spring 65. Said spring is also connected to a suitable pin 66. This spring holds the crank-arm 64 normally in the position shown in Fig. 8 of the drawings and pushes the crank-arm 62 against the pin 52, forcing said pin outwardly against the lever 54 and holding said lever normally in the position shown in Fig. 3. The printing-press arranged opposite the plate 18 is supported upon the rock-shaft 60 and is adapted to slide freely upon said shaft, so that it may be brought opposite any of the vertical columns on the record-sheet. For the purpose of moving the printing-press in either direction upon the rock-shaft 60, a chain or cord 67 is connected to said printing-press, passes over the supporting-rollers 68, and has its ends connected to the pulley 57, so that as the pulley 57 is rotated said printing-press is moved in one direction or the other along the rock-shaft 60, and thereby said press may be brought opposite any one of the vertical columns on the record-sheet. This printing-press consists of a plate 69, mounted on the shafts 60 and 61, being supported on the shaft 60 by a sleeve 60' and of a plate 70, arranged on the sleeve 60' in close proximity to the plate 69 and sliding therewith. The plate 70 is preferably secured to the sleeve 60' by the pin 70'. Said shaft 60 is preferably provided with a longitudinal groove or key-seat and a pin 61' in the sleeve 60' engages this groove and compels the sleeve and plate 70 to rock with the shaft while leaving them free to move longitudinally thereon. The plate 70 is provided near its upper end with a printing-surface 71, upon which is formed a suitable type or character. The letter "V" has been used for this purpose. In proximity to this printing-surface is a pin 72, arranged to slide through the plate 70 and having upon its end a printing-surface. This printing-surface may be simply the end of the pin, in which case the mark that it makes upon the recording-sheet will be a round dot or period (.). This pin is connected to a crank-lever 73, pivoted upon the plate 79 and having one arm connected to a spring 74, the opposite end of the spring being connected to said plate 70. This crank-lever tends to slide the pin 72 forward in its support in the plate 70, so that its printing-surface will be flush with the printing-surface 71. The plate 69 carries the swinging arm 75, upon which is mounted an inking-roller 76. When the parts are in normal position, (see Fig. 4,) the inking-roller is in contact with the printing-surface 71. As the printing-press plate 70 is rocked forward this roller moves over the printing-surface 71 and over the end of the pin 72, inking both of these printing-surfaces. It will be understood that the record-sheet passes between the printing-press and the platen-plate 18, (see Figs. 4, 5, and 6,) and when the shaft 60 is rocked for the purpose of making a record upon the sheet the printing-surface 71 is pressed against the paper, which is then held between said printing-surface and the plate 18, and a suitable impression is made on said record-sheet. The shaft 61 is flattened or cut away on one side. (See Figs. 4, 5, and 6.) When this shaft is in its normal position, (indicated in Figs. 4 and 5 of the drawings,) as the printingpress-plate 70 is rocked with the shaft 60 the end of the pin 72 is pressed against the paper with the printing-surface 71. (See Fig. 5.) If, however, the shaft 61 is rocked into the position shown in Fig. 6, the edge of the shaft engages the lever 73 as the plate 70 is rocked with the shaft 60, and the pin 72 is prevented from moving against the paper, (see Fig. 6,) and in this instance only one impression is made on the paper, and that is the impression that is made by the printing-surface 71. When only the printing-surface 71 is allowed to press against the paper, it indicates that the record was made by an employee going out or leaving the establishment. When both the printing-surface 71 and the end of the pin 72 are brought against the paper, the record made will indicate that the employee has come into the establishment.

For the purpose of rocking the shaft 61 said shaft is provided with a crank-arm 78, to which is connected a rod 79. The lower end of this rod is connected to a crank-arm 80 on a short shaft 81, that is mounted in a suitable bearing in the door. Upon the outer end of this shaft is arranged a crank-handle 82, and above this shaft are buttons carrying the words "Out" and "In." When the employee is leaving the establishment, before he registers he must turn the crank-arm 82 against the "out" button, and when he comes in, before he registers he must turn the crank toward the "in" button. The crank-arm 80 extends in the opposite direction beyond the shaft 81 (see Fig. 7) and forms a stop for the crank-arm 63 on the shaft 59, so that when the crank-handle 82 is midway between the two buttons on the front of the door or in normal position the shaft 59 cannot be rocked owing to the engagement of the crank-arm 63 with the end of the crank-arm 80. Hence before the employee can register he must turn the crank-handle 82 to the "in" or "out" position. The shaft 81 also carries a disk 83, having on its edge two notches, and a spring 84 is connected to this disk and also to the wall of the door. (See Fig. 7.) This spring returns the shaft 81 and the crank-handle 82 to their normal positions (shown in Fig. 1 of the drawings) after each registration on the machine. The latch 85 is arranged to bear against the edge of the disk 83 and is held against said disk by the spring 86. When the crank-handle 82 is turned in either direction, this latch engages one of the notches or recesses of the disk 83 and locks the parts in this position. This latch is preferably provided with a substantially horizontal portion having a curved edge, that stands opposite the edge of the crank-arm 63. When the employee turns the crank-handle 82 to the "in" or "out" position, he moves the stop formed by the crank 80 out of the path of movement of the crank-arm 63 and turns the disk 83, so that the latch 85 engages one of the notches in the edge of this disk. Then as the employee registers the crank-arm 63 moves against the edge of the latch 85, forces said latch out of the notch in the edge of the disk 83, and permits the spring 84 to return said disk and the connected parts, together with the rock-shaft 61, to their normal position.

In order to make a clear impression on the record-sheet, it is desirable to give the printing-press a quick rocking movement. To accomplish this, the rock-shaft 60 is provided near one end with a disk 88, to which is connected a spring 89, the opposite end of said spring being connected to the crank 64 on the rock-shaft 59. A bar 90 has its upper end pivotally connected to the disk 88. The edge of this bar presses against the flanged plate 58 and is adapted to slide thereon. The plate 58 is provided with a lug 91, arranged below the end of the bar 90. The bar 90 is also provided with an inclined slot 92, that is engaged by a pin on the end of the crank-arm 64. The first movement of the rock-shaft 59 causes the bar 90 to be moved downward until its end encounters the stop 91, which prevents the further movement of said bar. The movement thus imparted to the shaft 60 causes the printing-press plate 70 to be moved slightly, so that the inking-roller rolls over the printing-surfaces. The further movement of the rock-shaft 59 and crank arm 64 puts the spring 89 under tension, and at the same time the engagement of the pin on the crank 64 with the inclined wall of the slot 92 moves the lower end of the bar 90 outwardly, and this movement continues until the end of the plate is clear of the stop 91. (See Fig. 9.) By this time the spring 89 will be put under considerable tension, and as soon as the end of the bar is clear of the stop the tension of the spring will give to the shaft 60 a quick rocking movement, thereby causing the printing-surfaces carried by the plate 70 to strike a sharp blow upon the surface of the record-sheet. A suitable bell or gong 93, with a pivoted hammer 94, is arranged upon the inner surface of the door, the hammer being provided with a lug 95, connected to a slot 96 in the lower end of the bar 90. The same movement of the bar 90 that causes the shaft 60 to impart the necessary movement to the printing-press also causes the hammer to strike a quick blow upon the bell or gong. The gong will therefore be sounded each time that an employee registers upon the machine.

In Figs. 17 to 21 I have shown a modification of the "in" and "out" indicator and mechanism. As here shown, the crank-shaft 81 carries upon its inner end a cam plate or disk 100. This disk is provided near its ends with the notches 101 and with the intermediate recess 102. It is also provided with the lugs 103 and with the pointed stud 104. Between the lugs 103 and at one side thereof is a projection 105, to which is pivotally connected the bar 106, provided with a slot 107, through which extends a guide-screw 108. The upper end of this bar is turned outwardly and is connected to the crank-arm 109 on the shaft 61. As the crank-shaft 81 is turned by the crank-arm 82 either to the "in" or "out" position the cam-disk 100 is correspondingly turned, and thereby the shaft 61 is rocked and permits either the single or the double impression to be made on the paper, as described, so as to indicate that the registration has been made either by a person coming in or a person going out, as the case may be.

It is necessary that the registering and printing mechanism shall be locked at all times except when this indicator is set either for "in" or "out," and that when this indicator is so set for either "in" or "out" the registering and printing mechanism can be operated, and that an indicator will be immediately returned to its normal position after each printing operation.

The shaft 59 is provided with the arm 63, as in the construction already described, and for the purpose of normally locking this arm, and thereby preventing the printing mechanism from being operated, I prefer to provide a pivoted lever 109', carrying a lug 110, adapted to stand in the path of movement of the crank-arm 63, and thereby to prevent said crank-arm from moving. The lever 109 also carries a pin 111, that bears against the edge of the cam-disk 100, being held against said plate by a spring 112. When in normal position, the parts stand, as shown in Figs. 17 and 18 of the drawings, with the lug 110 in the path of movement of the crank-arm 63. By turning the crank-arm 82 either to the "in" or the "out" position the cam-disk 100 is turned so as to bring one of the notches 101 into engagement with the pin 111. The lug 110 is thereby moved out of the path of movement of the crank-arm 63, and as the cam-disk 100 is turned in either direction the shaft 61 is moved through the rod 106, and thereby said shaft is brought into such position that the printing mechanism will make either a single or a double impression, as required. The pressure of the spring 112 forces the pin 111 against one of the notches 101 in the edge of said cam-disk 100, and thereby locks the disk in the position to which it has been moved, and also locks the shaft 61 in the position to which it has been rocked by the movement of the bar 106. As the lever 54 is pressed inward in the recording operation the shaft 59 is rocked, and thereby the crank-arm 63 is forced inward toward the cam-disk 100. Said crank-arm is provided with a beveled inner edge which strikes one side of the pointed stud 104, thereby turning the cam-disk upon its axis until the pin 111 has passed out of the notch 101, when the pressure exerted upon the edge of the disk by the spring 112 will cause said disk to turn until the lugs 103 come in contact with the edges of the crank-arm 63. In this position the said disk will be locked during the printing operation, and when this operation is completed and the operating-lever 54 is released the crank-arm 63 will be moved outward to its original position, and thereby the cam-disk 100 will be restored to its normal position, (shown in Figs. 17 and 18 of the drawings,) and the lever 109 will be moved into position to bring the lug 110 into the path of movement of the crank-arm 63, thereby locking all of the mechanism until the crank-arm 82 is again turned to its "in" or "out" position. By this means the entire mechanism is locked except when the operator turns the crank-arm into position to register either "in" or "out." When this is done, the operating mechanism is released and may be moved for the purpose of printing upon the record-sheet, and as soon as the printing operation is completed the parts are automatically restored to normal position.

The operation of the machine will be readily understood from the foregoing detailed description of the mechanism. The principal object sought to be gained is to provide a machine that will be very simple in construction and which will at the same time be positive in all parts of its operation. It will be obvious that many of the details of the mechanism may be varied without departing from the invention.

I claim as my invention—

1. In a time-recorder, the combination, with a support and means for attaching a flat record-sheet thereto, of means for moving said support and its attached record-sheet in a single plane, movable recording mechanism carried by said time-recorder and arranged to make upon said sheet, at the will of the operator, either a single or a dual impression, and means for operating said recording mechanism, substantially as described.

2. In a time-recorder, the combination, with a support and means for attaching a flat record-sheet thereto, of means for moving said support and its attached record-sheet in a vertical plane, a laterally-movable recording mechanism carried by said time-recorder and arranged to make upon said sheet, at the will of the operator, either a single or a dual impression, and means for operating said recording mechanism, substantially as described.

3. In a time-recorder, the combination, with a clock mechanism, of a support for a flat record-sheet, means connecting said support with said clock mechanism, whereby said support and its attached sheet are gradually moved in a single plane, a recording mechanism carried by said time-recorder, means for removing said recording mechanism in a direction at right angles to the line of movement of said support, and means for operating said recording mechanism to make upon said sheet, at the will of the operator, either a single or a dual impression.

4. In a time-recorder, the combination, with a clock mechanism, of a vertically-movable flat record-sheet support, connected to and operated by said clock mechanism, means for securing a flat record-sheet to said support, and a laterally-movable recording mechanism carried by said time-recorder and arranged to make upon said sheet, at the will of the operator, either a single or a dual impression.

5. In a time-recorder, the combination, with a clock mechanism, of a vertically-movable record-sheet support, means connecting said support with said clock mechanism, whereby the support is gradually raised, means for securing a flat record-sheet to said support, means for releasing said support at a predetermined time, a door arranged in front of said support, a laterally-movable recording mechanism carried by said door and movable independently of the record-sheet and arranged to make a record thereon.

6. In a time-recorder, the combination, with the clock mechanism, of a record-sheet support, means operated by the clock mechanism for gradually raising said support, means for securing to said support a flat record-sheet having vertical and horizontal rulings, a door arranged in front of said record-sheet support, and a laterally-movable recording mechanism carried by said door and arranged to make a record upon said record-sheet.

7. In a time-recorder, the combination, with a support and means for attaching a flat record-sheet thereto, of means for moving said support and its attached record-sheet in a single plane, a door arranged in front of said record-sheet support, a laterally-movable recording mechanism carried by said door and movable independently of said record-sheet, and arranged to make a record thereon.

8. In a time-recorder, the combination, with means for supporting and moving a flat record-sheet, of a recording mechanism carried by said time-recorder and having two impression-surfaces, and means for causing, at will, one or both of said surfaces to come in contact with the record-sheet, whereby either a dual impression, or a single impression, may be made upon said sheet, thereby distinguishing records made by employees entering the establishment from those made by them in going out.

9. In a time-recorder, the combination, with time-controlled means for supporting and moving a record-sheet, of a recording mechanism carried by said time-recorder and arranged to make, at will, either a single mark or two marks on the sheet at one operation.

10. In a time-recorder, the combination, with time-controlled means for supporting and moving a record-sheet, of a recording mechanism carried by said time-recorder and having one relatively fixed and one movable recording-surface, and means for causing at the will of the operator, one or both of said surfaces to make a record on said sheet.

11. In a time-recorder, the combination, with a suitable casing and means within the casing for supporting and moving a flat record-sheet, of a door forming the front of said casing, a laterally-movable recording mechanism carried by said door and movable independently of said record-sheet, and means on the outside of the casing for moving and operating said recording mechanism.

12. The combination, with a record-sheet support, carrying a horizontally and vertically ruled record-sheet, and a clock mechanism for moving the same vertically, of a door in front of said support, a laterally-movable recording mechanism carried by said door and movable independently of said record-sheet, means for operating said recording mechanism, and an indicator to show to the operator the position to which the recording mechanism is moved.

13. In a time-recorder, the combination, with the record-sheet support, a clock mechanism for moving the same, and a platen in front of which the record-sheet is moved, of the rock-shaft 60, and a recording mechanism mounted on said rock-shaft and operated thereby.

14. In a time-recorder, the combination with the record-sheet support, a clock mechanism for moving the same, and a platen in front of which the record-sheet is moved, of the rock-shaft 60, a recording mechanism supported and laterally movable on said shaft, means for moving said recording mechanism on said shaft, and means for rocking said shaft and thereby operating the recording mechanism.

15. In a time-recorder, the combination, with a suitable clock mechanism, of a pulley or drum, a clutch connecting said pulley or drum with said clock mechanism, a record-sheet support, means connecting said record-sheet support with said pulley or drum, whereby as said pulley or drum is rotated in one direction, said support is raised, means releasing said clutch at a predetermined time, and permitting said support to descend, a shaft 40 carrying a roll or weight 41, and a clutch mechanism connecting the shaft 40 with said pulley or drum, for the purpose set forth.

16. In a time-recorder, the combination, with the record-sheet support, and means for moving the same of the laterally-movable recording mechanism, independently movable with reference to the record-sheet, the pulley 57, the chain 67 connecting said pulley with said recording mechanism, and means for turning said pulley in either direction.

17. In a time-recorder, the combination, with a record-sheet support, and means for moving the same, of the laterally-movable recording mechanism, independently movable with reference to the record-sheet, the pulley 57, chain 67 connecting said pulley with said recording mechanism, the gudgeon 15 supporting said pulley, the crank 51 and the operating-lever 54.

18. In a time-recorder, the combination, with the record-sheet support and the laterally-movable recording mechanism independently movable with reference to the record-sheet, of the pulley 57, the chain 67 connecting said pulley with said recording mechanism, the gudgeon 15 supporting said pulley, the crank-arm 51, the operating-lever 54, and the flanged ring having a series of numbered recesses or notches over which said lever moves.

19. In a time-recorder, the combination, with a suitable casing and a door forming the front of said casing, a record-sheet support arranged in said casing, and means for moving the same, of a laterally-movable recording mechanism arranged within said casing and supported upon said door and independently movable with reference to the record-sheet, the pulley 57 supported on the inside of said door, means connecting said pulley with said recording mechanism, and the operating-lever for moving said pulley, located upon the outside of said door.

20. In a time-recorder, the combination, with a suitable casing and a door forming the front of said casing, a record-sheet support arranged in said casing and means for moving the same, of a laterally-movable recording mechanism arranged within said casing and supported upon said door and independently movable with reference to the record-sheet, the pulley 57 supported on the inside of said door, and connected with said recording mechanism, whereby said mechanism is moved by the rotation of said pulley, an operating-lever arranged upon the outside of said door and connected with said pulley, and a notched ring arranged upon the outside of said door over which said lever is adapted to move, substantially as described.

21. In a time-recorder, the combination with the grooved rock-shaft 60, of the sleeve 60' mounted upon said shaft, provided with the pin 61' engaging said groove, and the recording-plate 70 secured to said sleeve and provided with the recording-surface 71, substantially as described.

22. In a time-recorder, the combination, with the recording mechanism, of a rock-shaft 60 upon which said mechanism is mounted, and means for rocking said shaft, comprising the rock-shaft 59, the slotted bar 90, the spring 89, the crank-arm 64, and the stop 91, substantially as described.

23. In a time-recorder, the combination, with the recording mechanism, of the rock-shaft upon which said mechanism is supported, means for rocking said shaft, a stop temporarily engaging and holding the rocking means, and a spring arranged to give said shaft a quick movement when the rocking means is disengaged from said stop.

24. In a time-recorder, the combination, with the recording mechanism, its operating means, and a stop for said mechanism, of a crank-arm on the outside of the casing adapted to be moved into position to indicate either "in" or "out," said crank-arm being arranged to move said stop to permit said recording mechanism to be operated, when said arm is moved to either the "In" or "Out" position.

25. In a time-recorder, the combination, with the recording mechanism, its operating means, and a lock for said mechanism, of an "in" and "out" indicator, and means connecting said indicator with said lock, substantially as described.

26. In a time-recorder, the combination, with the recording mechanism, its operating means, and a lock for said mechanism, of an "in" and "out" indicator arranged to release said recording mechanism whenever said indicator is moved to either an "in" or "out" position.

27. In a time-recorder, the combination, with the recording mechanism, its operating means, and a lock for said mechanism, of an "in" and "out" indicator, arranged to release said recording mechanism, when said indicator is moved to either an "in" or "out" position, and means for restoring said lock when the recording operation is completed.

28. In a time-recorder, the combination, with the recording mechanism, its operating means, and a lock for said mechanism, of an "in" and "out" indicator arranged to release said recording mechanism when said indicator is moved to either an "in" or "out" position, means for releasing said lock at the beginning of the recording operation, and means for automatically restoring said lock to its original position when the recording operation is completed.

29. In a time-recorder, the combination, with the recording mechanism, and a lock for said mechanism, of an "in" and "out" indicator, and means connecting said indicator with said lock, substantially as described.

30. In a time-recorder, the combination, with a support for a flat record-sheet, means for moving the same vertically, means for releasing said support and permitting it and the attached sheet to descend by gravity to its starting-point, and means for retarding the descent of said support, of a laterally-movable recording mechanism, a door in front of said support by which said recording mechanism is carried and upon which it is movable independently of said record-sheet, and means for operating said recording mechanism to impress one or more characters on said sheet.

31. In a time-recorder, the combination with a support for a flat record-sheet and a clock-actuated mechanism for moving the same in a single plane, of a recording mechanism carried by said time-recorder and movable independently of the record-sheet in a plane transverse to the movement of said sheet, an indicating and actuating lever arranged to be moved by the operator, first, to position the recording mechanism, and, second, to make an impression upon said record-sheet, and a lock for the recording mechanism that must be operated before an impression can be made on said sheet.

32. In a time-recorder, the combination with a support for a flat record-sheet and a clock-actuated mechanism for moving the same in a single plane, of a recording mechanism carried by said time-recorder and movable independently of the record-sheet in a plane transverse to the movement of said sheet, and an indicating and actuating lever arranged to be moved by the operator, first, to position the recording mechanism, and, second, to make an impression upon said record-sheet.

33. A workman's time-recorder including recording mechanism, "in" and "out" mechanism, and interlocking means between said two mechanisms.

34. A workman's time-recorder including recording mechanism, "in" and "out" mechanism, and means requiring the "in" and "out" mechanism to be operated before the recording mechanism can be operated.

35. A workman's time-recorder comprising in combination, a suitable casing, a time-controlled recording mechanism arranged therein, an operating-lever for said recording mechanism arranged on the outside of the casing, and "in" and "out" mechanism having an operating-handle also located upon the outside of the casing, and mechanism requiring the handle of the "in" and "out" mechanism to be set to either the "in" or the "out" position before the recording mechanism can be operated.

In witness whereof I have hereunto set my hand this 23d day of December, 1905.

SEWARD A. DEAN.

Witnesses:
A. C. PAUL,
M. E. SCOTT.